(No Model.) 7 Sheets—Sheet 1.
L. SMITH.
PNEUMATIC GRAIN TRANSFER, STORAGE, AND PRESERVATION STATION.

No. 446,026. Patented Feb. 10, 1891.

WITNESSES
F. L. Durand
Jno. Enders Jr.

INVENTOR
Lyman Smith (No Model.) 7 Sheets—Sheet 2.
L. SMITH.
PNEUMATIC GRAIN TRANSFER, STORAGE, AND PRESERVATION STATION.
No. 446,026. Patented Feb. 10, 1891.
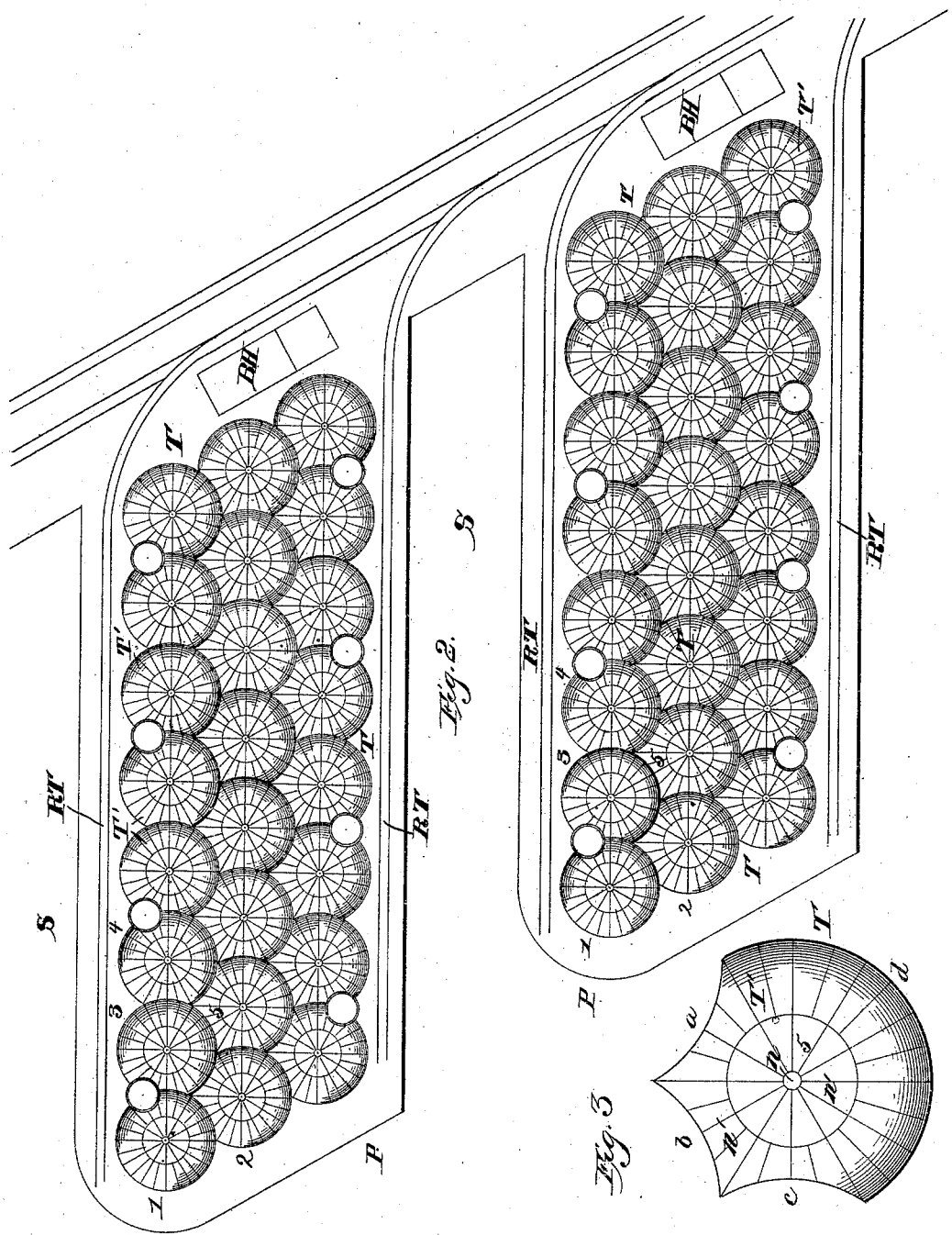

(No Model.) 7 Sheets—Sheet 3.
L. SMITH.
PNEUMATIC GRAIN TRANSFER, STORAGE, AND PRESERVATION STATION.

No. 446,026. Patented Feb. 10, 1891.

WITNESSES
F. L. Ourand
Jno. Enders Jr.

INVENTOR
Lyman Smith (No Model.)  7 Sheets—Sheet 4.
L. SMITH.
PNEUMATIC GRAIN TRANSFER, STORAGE, AND PRESERVATION STATION.
No. 446,026. Patented Feb. 10, 1891.
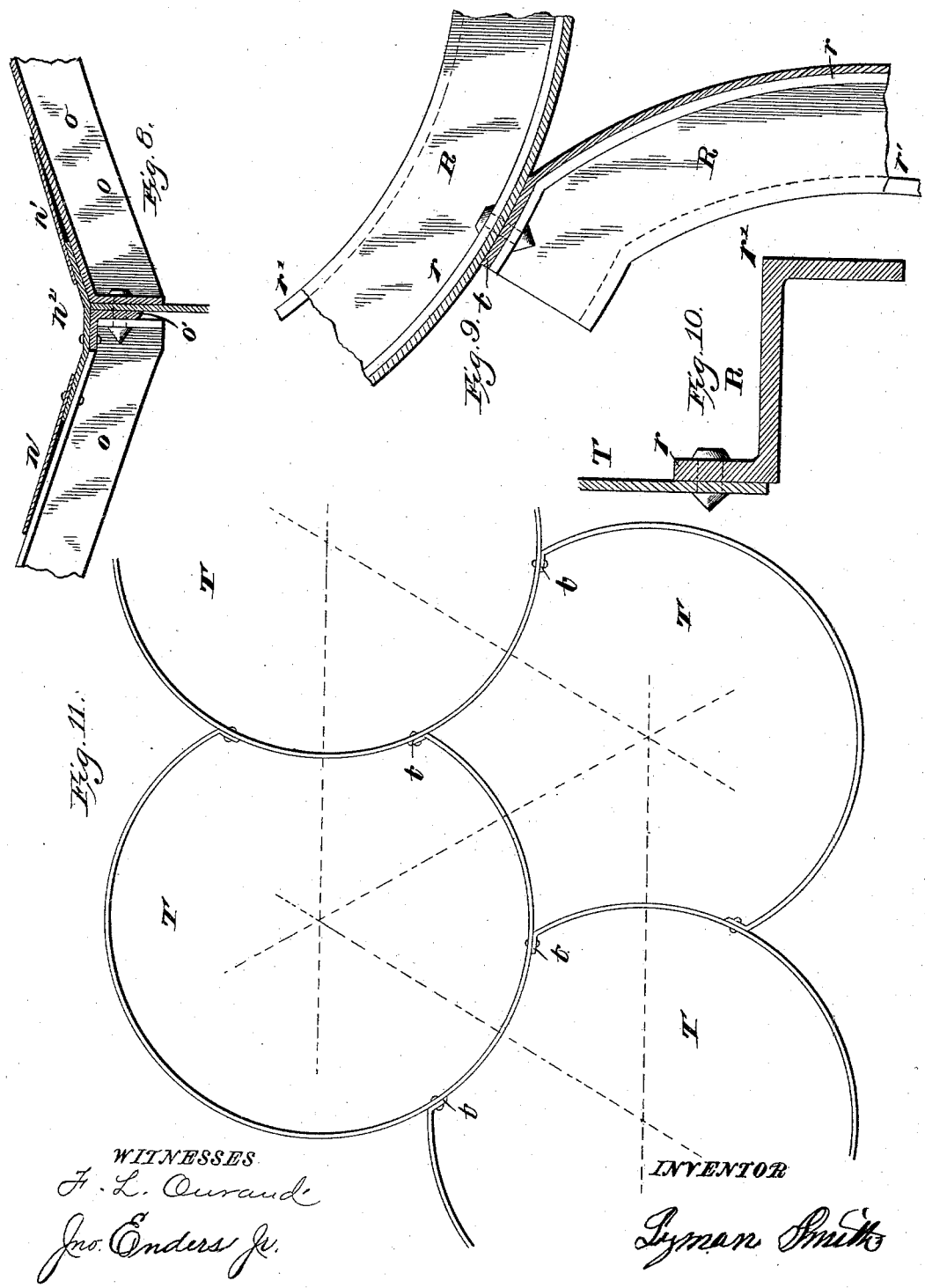
WITNESSES
F. L. Durand
Jno. Enders Jr.
INVENTOR
Lyman Smith

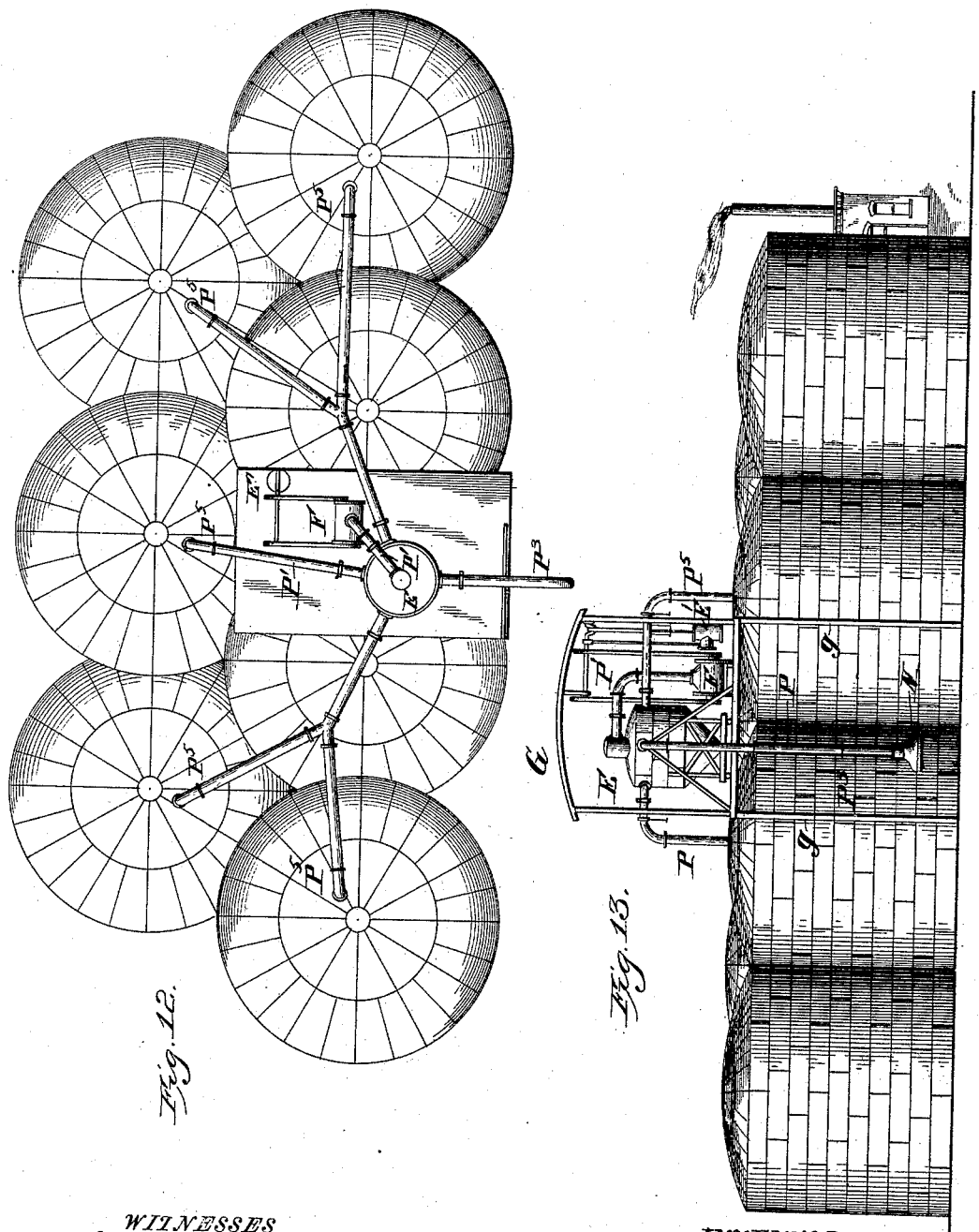

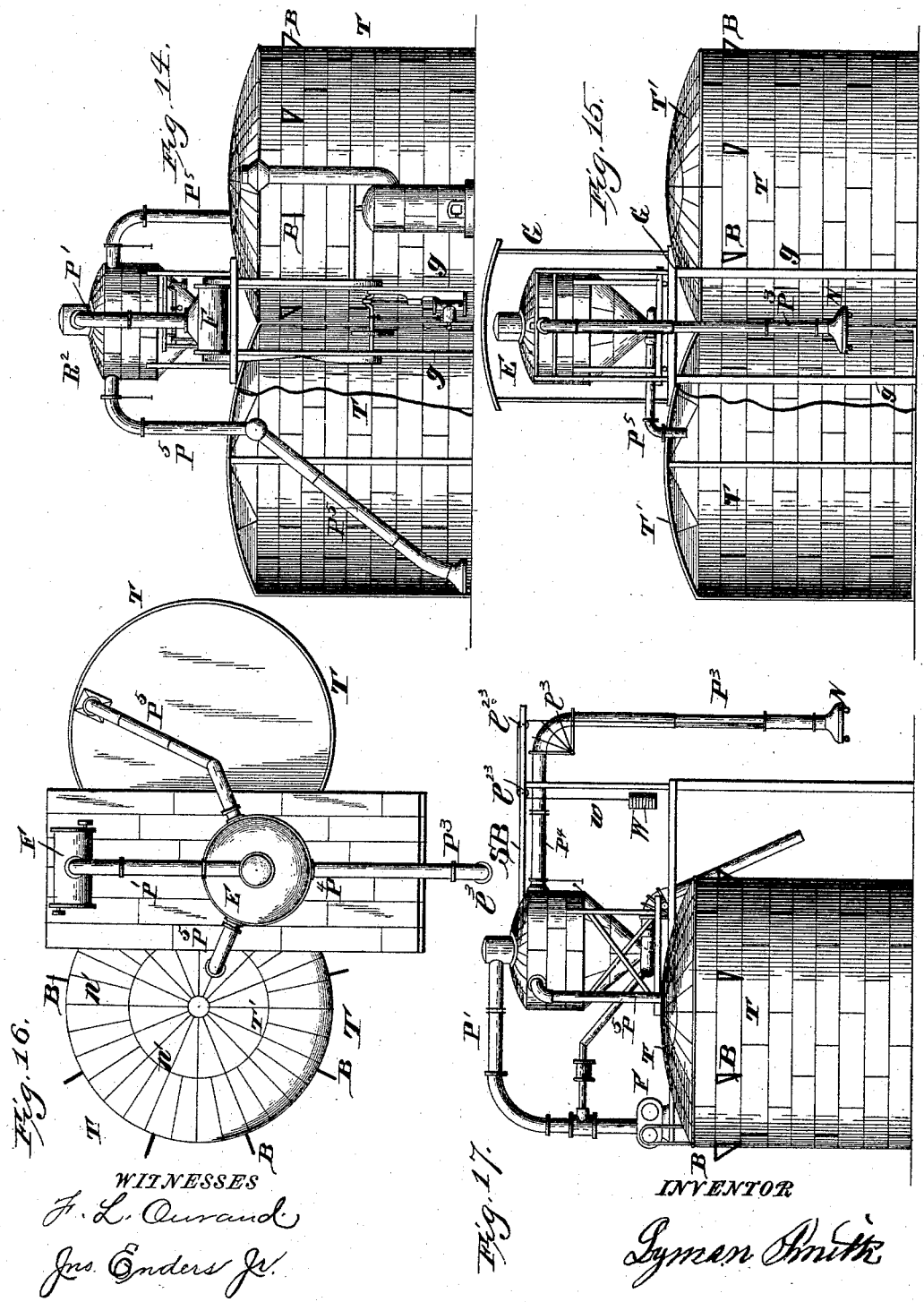

(No Model.) 7 Sheets—Sheet 7.
L. SMITH.
PNEUMATIC GRAIN TRANSFER, STORAGE, AND PRESERVATION STATION.
No. 446,026. Patented Feb. 10, 1891.
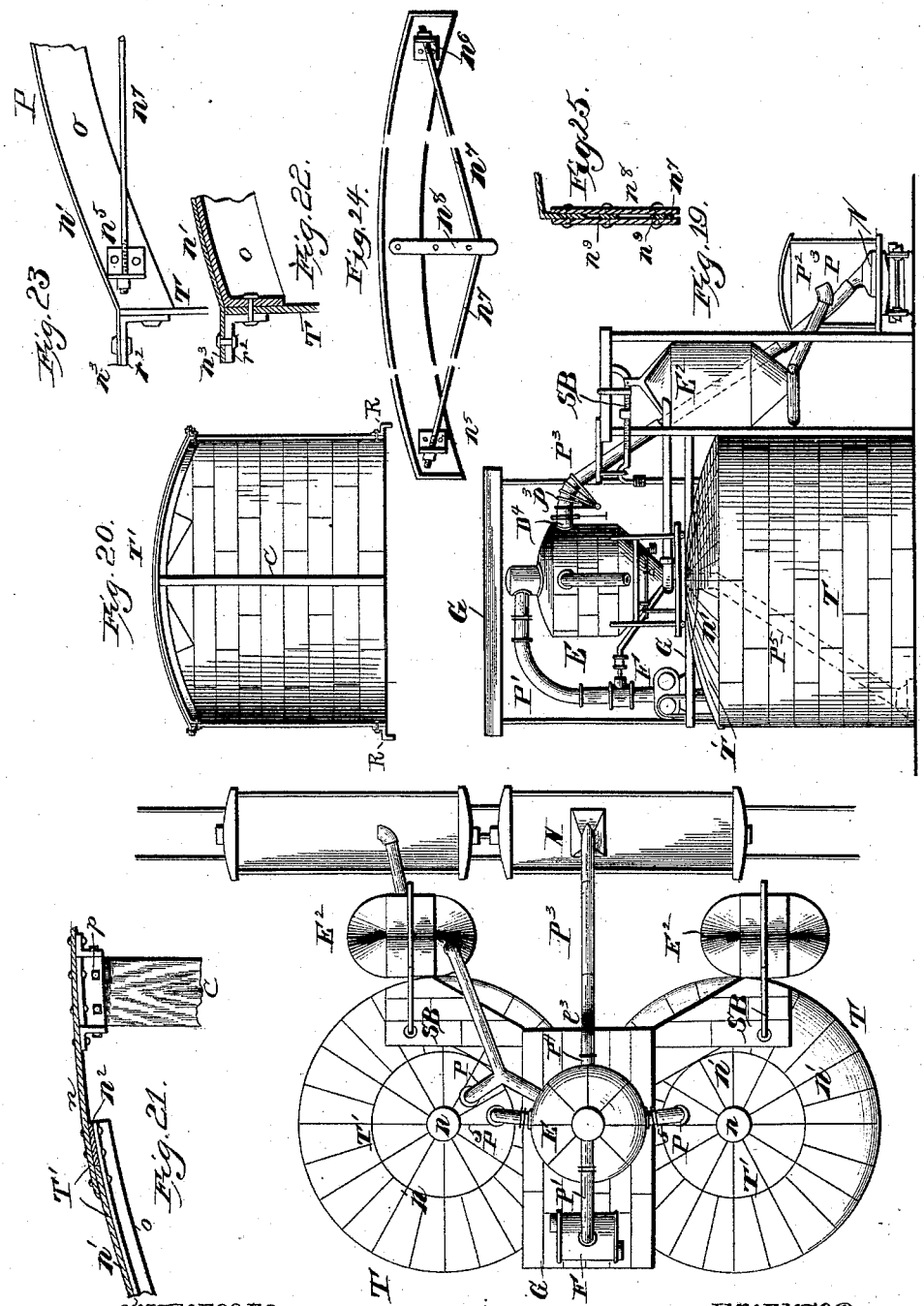
WITNESSES
F. L. Ourand
Jno. Enders Jr.
INVENTOR
Lyman Smith

UNITED STATES PATENT OFFICE.

LYMAN SMITH, OF CHICAGO, ILLINOIS, ASSIGNOR TO THE SMITH PNEUMATIC TRANSFER AND STORAGE COMPANY, OF WEST VIRGINIA.

PNEUMATIC GRAIN TRANSFER, STORAGE, AND PRESERVATION STATION.

SPECIFICATION forming part of Letters Patent No. 446,026, dated February 10, 1891.

Application filed May 3, 1890. Serial No. 350,494. (No model.)

*To all whom it may concern:*

Be it known that I, LYMAN SMITH, a citizen of the United States, residing at Chicago, in the county of Cook and State of Illinois, have invented certain new and useful Improvements in the Pneumatic Grain Transfer, Storage, and Preservation Station; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
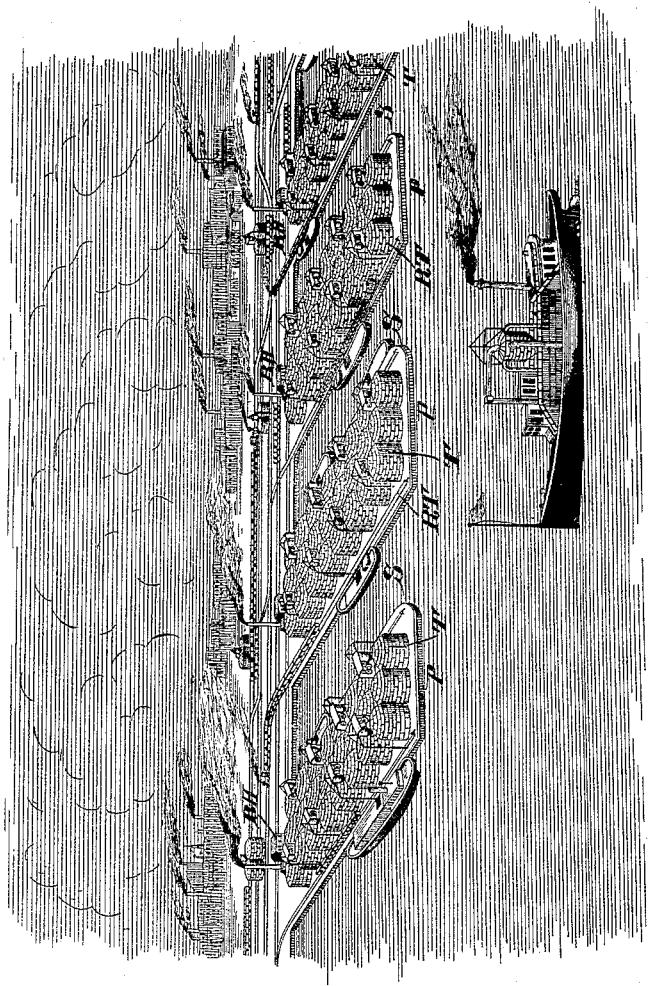
Figure 4:
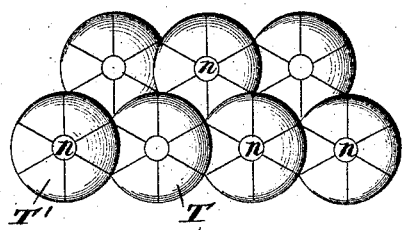
Figure 5:
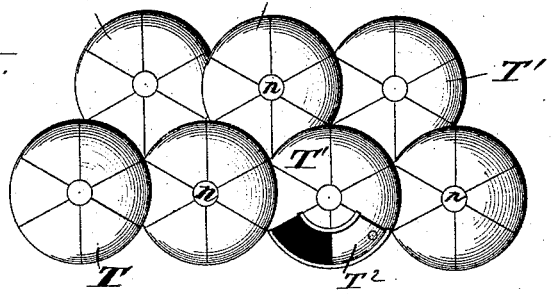
Figure 6:
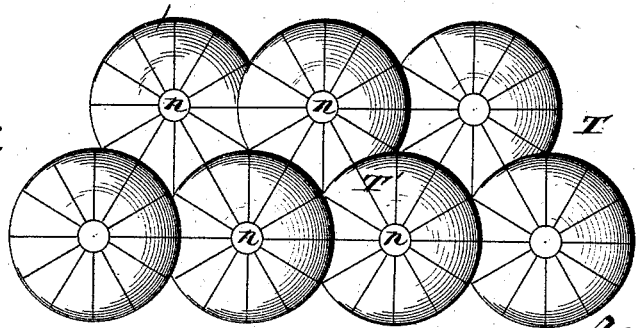

Referring to the drawings, Figure 1 is a general perspective view of a harbor or river storage station. Fig. 2 is an enlarged top plan view of two of the storage docks or piers, illustrating groups of twenty-four storage-tanks. Fig. 3 is a like view of one of the tanks. Figs. 4 to 7, inclusive, show groups of seven storage-tanks of varying capacities. Figs. 8 to 10, inclusive, are detail views. Fig. 11 is a top plan view of part of a group of four tanks without dome or roof, illustrating the mode of assembling or connecting the tanks. Fig. 12 is a top plan view, and Fig. 13 a side elevation, of a group of seven tanks and the necessary pneumatic transferring and automatic weighing appliances. Figs. 14 and 15 are elevations, partly in section, and Fig. 16 is a top plan view, partly in section, of two tanks combined with pneumatic transferring and weighing apparatus. Fig. 17 is an end elevation of Figs. 14, 15, and 16. Fig. 18 is a top plan view of a pair of tanks and the pneumatic transferring and weighing apparatus combined with auxiliary weighing apparatus adapted to weigh a car-load of grain. Fig. 19 is a side elevation thereof. Fig. 20 is a vertical axial section of a tank, and Figs. 21 to 25 are detail views.

The invention relates to the storage of food products and more particularly to the storage of grain.

The storage of grain as now effected involves not only great expenditures in the erection of storage buildings and mechanical appliances to transfer the grain from a conveyance or from the ground to the different stories of such buildings, but also great expenditures in handling the grain for transfer to or from the storage floors in weighing the same and in the necessary labor to insure its preservation while in storage.

The present invention has for its object to materially reduce these expenditures by providing storage facilities designed to take the place of the costly storage-buildings, or so-called "grain-elevators," by providing means whereby the labor involved in the handling of grain for transfer to or from the place of storage is very materially reduced, and to provide means whereby the manual labor heretofore involved in the preservation of the grain stored is entirely dispensed with.

The invention has for its further object the construction of absolutely fire-proof storage chambers or cells, of substantially cylindrical form, in order to insure the greatest strength, and of such construction as to render the greater portion of a given superficial area available for storage purposes.

To these ends the invention consists in a storage system comprising a group of substantially cylindrical plate-steel tanks, so connected together as to avoid all loss of space between adjacent tanks, mechanism for conveying the grain to and from the tanks, mechanism for weighing the grain to be stored in or to be transferred from the tanks, and appliances and means for insuring the preservation of the grain while in storage.

The invention further consists in locating the mechanism for transferring the grain to or from the storage-tanks, and the means for weighing such grain on top of the tanks, whereby a great amount of space is economized and free access is had to the storage-tanks.

The invention further consists in dividing a group of tanks into sets of a given number and providing transfer mechanism for each set of tanks, whereby great lengths of transfer-pipes are avoided, and whereby grain may be transferred to or from any one or more sets of the group or any individual tank of a set without interfering with the transfer of grain to or from any one or more tanks of another set or sets of the group or any individual tank of such other sets, so that grain may, for instance, be transferred to one or more tanks of a set and at the same time grain may be transferred to or from any one or more tanks of another set.

The invention further consists in details of construction and in the combination and co-operation of elements or organs as will now be fully described, reference being had to the accompanying drawings.

*The storage system.*—The storage system as a whole is such as to adapt it to be located at any desired point, and the storage area can be regulated according to the amount of grain that may be brought thereto by constructing the storage-tanks of the required capacity. On the other hand, if ground-space or superficial area where the storage-tanks are located is available the storage capacity may at any time be increased at a comparatively small expense, according to the increase in the amount of grain to be stored. Thus, for instance, in a grain district a storage-station consisting of a single tank, with the necessary appliances for transferring the grain to or from the same, for weighing the grain, and for insuring its preservation, may be established at some railway station, and as the amount of grain grown and to be stored increases other tanks may be added at substantially the same expense as the original tank and at a comparatively small expense as compared with the expense incurred in increasing the capacity of a storage-building or grain-elevator. In this manner the storage facilities can be made to grow, if I may so express myself, with the growth of the grain area of the surrounding country. On the other hand, the system will afford facilities to the grain-grower which will place the grain market in his own hands instead of placing him at the mercy of the speculator. For instance, a storage-station may be established by one or more counties at public expense, and at the low price of plate-steel such a station could be established at a cost which would insure to the farmer a place for storage and preservation of his grain at perhaps two cents and even less per bushel per annum. He could thus hold his grain and sell whenever he may obtain a remunerative price. Such storage-stations may also be established in large centers of population at any available point. In Figs. 1 and 2 I have shown such a station on a water-front, and in this case the storage-tanks are located on suitable piers or docks, the tanks being set on or in a concrete foundation, so that a bottomless tank can be used. When the storage-tanks are located on docks or piers, I preferably construct the latter about at an angle of sixty degrees to the water-front, as shown in Fig. 2, thereby materially facilitating the ingress and egress of vessels to and from the slips S and the approach of railways, each pier P having a railway track R T, laid along both sides of the group of tanks, and the necessary boiler-houses B H for the steam-generator from which the necessary amount of steam is supplied for driving the machinery for transferring the grain to or from the tanks and for treating the grain to insure its preservation.

It has long been an established fact that food products are best preserved by absolute exclusion of air therefrom to prevent fermentation and to destroy animalculæ or insects that may already be present in such products before storage. To this end the storage-tanks are constructed air-tight, means being provided for exhausting the air therefrom. Inasmuch as grain in a more or less moist condition, or grain that may have absorbed more or less moisture during transportation to the storage-station, would be liable to deteriorate even under exclusion of air, I also provide means whereby such absorbed or superficial moisture may be removed after being transferred to the tank, and to further insure the preservation thereof I prefer to introduce carbonic-acid gas into the tanks after the air is exhausted therefrom or while the air is being exhausted therefrom. The antiseptic and germ-destroying properties of this gas are well known, as well as the fact that said gas when pure does not injuriously affect food products. With the facilities now available for liquefying carbonic-acid gas, thereby insuring a pure gas, I prefer to use it in a liquid state, though carbonic-acid gas derived from the combustion of charcoal or from any other source may be used. The gas may be admitted to the storage-tanks direct from the holder of the acid or from the generator, or from a reservoir connected with the holder in which such gas is stored under pressure or otherwise. These elements of the system I have deemed unnecessary to illustrate in the drawings.

*The storage-tank.*—The superior strength of the tube or cylinder as compared with any other form of holder or vessel is well known, and in the construction of the tanks it is the aim to preserve this form. A series of contacting circles, no matter how grouped together, will leave intervening spaces that in the case of vertical cylinders would be dead or lost space. To make this space available for storage and at the same time effect an economy in material, I so group the cylinders as that lines drawn through the axes of a group of, say, three cylinders will form an equilateral triangle having angles of sixty degrees, so that, no matter how grouped together or the number of tanks in a group, one tank only can be a perfect cylinder, all the remaining tanks being what I term "mutilated cylinders," as can be readily seen by an inspection of any one of the groups of tanks shown in the drawings. Taking, for example, the two groups of tanks, Fig. 2, if the tanks indicated by 1 in each group are perfect cylinders, all the remaining tanks must necessarily be mutilated cylinders in order to make the intervening spaces available. By so arranging the tanks it will be seen that a portion of the vertical walls of each cylinder, whether perfect or mutilated, will constitute a portion of the wall of the adjacent cylinder or cylinders, the extent of this varying according to their location relatively to one another.

Inasmuch as the tanks are constructed so that lines drawn through the axes of any three of them will form an equilateral triangle having angles of sixty degrees, each mutilated portion will necessarily be equal to one sixth of the periphery, so that a portion of the vertical wall of one tank will form the wall for a corresponding portion of an adjacent tank or tanks of a group. Thus two-sixths of the vertical wall of tank 1 will form one-sixth of the vertical wall of tanks 2 and 3, while tanks 2, 3, and 4 will each furnish one-sixth of the vertical wall for tank 5, an economy of one-half of the vertical wall of the latter tank, as shown at $a$, $b$, and $c$. (See Fig. 3.) In this manner all intervening or lost spaces are avoided, the groups of tanks furthermore forming an interconnected set of cells, which adds greatly to the stability of the whole.

The tanks may be provided with a bottom; but this is preferably dispensed with, it being designed to set the group of tanks on a cement concrete flooring. To this end I provide a support and anchor R, Figs. 9 and 10, that corresponds with the periphery of the tank—namely, said anchor will be a ring or a segment of such according as the tank is a perfect cylinder or a mutilated one. This anchor is Z-shaped in cross-section and is riveted to the inside of all the tanks, the vertical flange $r$ of said anchor being riveted to the tank, while the web and flange $r'$ are embedded in the cement concrete, so as to form an air-tight joint.

The tanks are connected together by riveting, for which purpose they are provided with a flange $t$ at the contacting edges, as shown in Fig. 11.

Referring now to Figs. 8, 21, 22, 23, 24, and 25, the dome T' of tank T comprises a crown-plate $n$, to the under side of which is riveted a box-bearing $p$, Fig. 21, for the upper end of an axial supporting-post C, that serves to support the dome. To this crown-plate are riveted the plates $n'$, that form the dome proper, said plates being supported from arch-girders $o$, that are L-shaped in cross-section, said girders being in their turn riveted to the vertical walls of the tanks. The girders $o$ are of such length as to project some distance beyond the dome-plates $n'$, a filler $n^2$ being inserted between the girder and the crown-plate $n$, and said crown-plate is riveted to the dome-plates and to the girder through the filler, as shown in Fig. 21. The dome-plates are made to project beyond the periphery of the tanks, as shown at $n^3$, Fig. 22, the projecting portion being riveted to a topping angle $r^2$, riveted to the tanks.

As shown in Fig. 8, the dome-plates $n'$ of adjacent tanks are riveted to a lap-plate $n^{21}$, the arch-girders $o$ being secured to angle-brackets $o'$. The arched girders are trussed girders, each girder being provided with brackets $n^5$ $n^6$ or with a bracket and bolt-hole for a truss-rod $n^7$, held in a stay $n^8$, Figs. 23, 24, and 25, composed of two flat bars of steel bolted to opposite sides of the web of the arch-girders and having spacing blocks or plates $n^9$ to hold the bars the proper distance apart, and so arranged as to form at their lower end a forked bearing for the truss-rod $n^7$. Each tank is further provided in its dome with a man-hole adapted to be hermetically closed by a cover T$^2$, Figs. 5 and 7.

In order to facilitate the construction of the storage-tanks and also to economize labor, it is intended that all elements that enter into their construction shall be interchangeable, so far as this is practicable. To this end I use a standard dimension of steel-plate—namely, three by fifteen feet. Such a plate bent into a cylinder will form a tank having a capacity of forty bushels, while fourteen such plates would form a tank having a capacity of one hundred thousand bushels.

If the present cost of rolled-steel plate is considered, an idea can be formed of the cost of construction, which, according to liberal estimates, would not exceed four cents per bushel. If, on the other hand, the cost of insuring the present storage structures against fire is considered, which with my system of steel storage-tanks is saved, it will be found that the cost of insurance alone on an elevator of a given capacity would cover the cost of construction of a steel storage system of like capacity. The dome and crown-plates and the lap-plates are also of uniform dimensions, as well as the bearing-boxes for the center-stay, the arch-girders, the topping angles, and the anchors. It is further intended that all the parts that are to be united by riveting shall have the rivet-holes ready punched, the assembling riveting and fitting together being done at the place where the station is to be established. In this manner I avoid the labor usually required in selecting the parts for each tank separately and also avoid the transportation of very bulky materials. About three feet from the dome the outer tanks of the group are provided with brackets B (see Figs. 14 to 17, inclusive) for the support of stage-planks for the workmen, such brackets being permanently connected to the tanks and may be used for a like purpose after the plant is established.

Each storage-station will be provided with the required steam or other motive power to operate the transferring appliances with air and carbonic-acid-gas conduits and a reservoir for the carbonic-acid gas when the use of such is deemed advisable.

In grain elevators as now constructed the elevating machinery is principally located on the ground outside, occupying valuable space and obstructing more or less the access to the elevators. In order to leave the space surrounding the storage-tanks unobstructed, I support the transfer mechanism from the tanks themselves, the construction of which as described forms as solid a foundation for the support of such mechanism as can possibly be provided. I have hereinbefore stated and given my reasons for dividing a group of tanks into sets of preferably seven tanks, and provide each set with the necessary transfer mechanism, except when the tanks are of very great capacity, when a group is or may be divided into sets of three, as shown in Fig. 1. A covered platform G, one end of which is supported by posts $g$ $g$, is erected in a valley between two tanks, (see Figs. 12 and 13,) the posts $g$, that support the outer end of the platform, extending along the vertical wall of the tank of the outer rows so as not to obstruct the circulation around the group of tanks, the cross-sills for the inner end and middle portion of the platform G, if such are used, being laid across the valley between two tanks, which thus substantially support the superstructure. In this superstructure are located, first, the transfer-receiver E, connected with the several tanks T of a set by means of the required transfer-pipes $P^5$; second, the exhaust-blower F, connected with said receiver by pipe P', and, thirdly, a steam-engine E', for operating the blower, said steam-engine being supplied with steam from a generator that supplies all the engines for operating the transfer mechanisms of the several sets of tanks of a group through suitable pipe connections, which in a plant such as shown in Figs. 1 and 2 will be located in the foundation for obvious reasons. As hereinbefore stated and as shown in Fig. 1, the steam-generator is preferably located at one end of the group of tanks in a suitable boiler-house B H.

The transfer apparatus shown in the drawings is operated pneumatically by means of the exhaust-blower F, and is fully described and shown in Letters Patent of the United States granted to me September 30, 1884, No. 305,976, January 4, 1887, No. 355,480, July 28, 1885, No. 323,226, and June 18, 1889, No. 405,331, in which is also shown a construction for weighing the grain in the receiver. These pneumatic transfer apparatuses are efficient in their operation and can be constructed at a comparatively low cost, and as a means for weighing grain to be stored or to be removed from the tanks and for conveying such to and from the tanks I prefer to use the said pneumatic conveyer, and it will therefore not be necessary to describe the same in detail.

Figure 7:
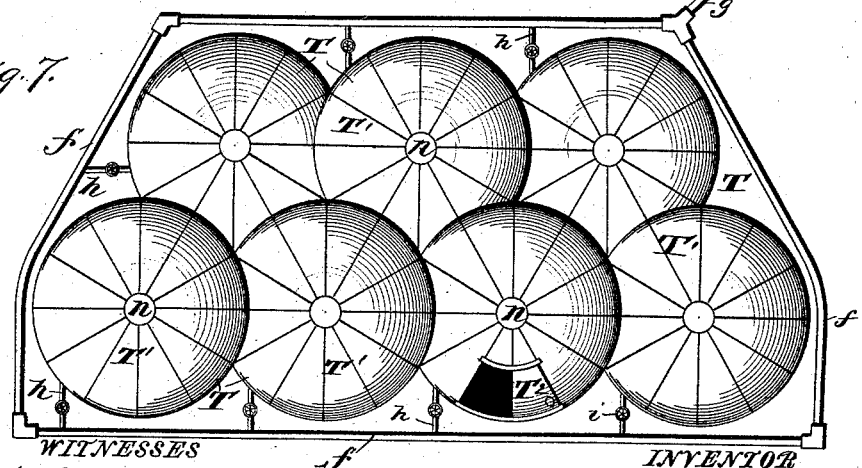

At those stations to which the grain is brought and from which it is taken by cars I preferably employ an additional receiver $E^2$, Figs. 18 and 19, suspended from a scale-beam S B and adapted to hold a car-load of grain, so that in loading cars a car-load may be weighed at one time and then transferred to the car pneumatically through the discharge-pipe $P^2$, two such receivers being provided for each transfer apparatus. In this manner when the weight on the scale-beam S B for the additional receiver is once adjusted the operation of weighing is automatic, requiring simply the manipulation of the inlet and outlet valves. That portion of the transfer-pipes $P^5$ within the tanks T is telescopic or flexible for obvious purposes and has a suction and discharge spout or nozzle, preferably such as shown and described in my Letters Patent of the United States, dated July 28, 1885, Nos. 323,224, 323,225, and 323,317, and the receiver E is provided with a suction and discharge pipe $P^3$, to be connected with the conveyance that brings or takes the grain, said pipe being also flexible or telescopic and having a similar suction and discharge spout or nozzle. The pipe $P^3$ is provided with a telescopic elbow $p^3$, preferably such as described and shown in my Letters Patent of the United States, dated January 29, 1889, No. 396,773, said elbow being connected with a horizontal pipe $P^4$, which last-named pipe is connected with the receiver E by a universal joint, the whole being supported from a swinging boom, substantially as described in my Letters Patent of the United States, dated June 18, 1889, No. 405,331. Suitable valved air-pipes (not shown) are provided for supplying the air to be drawn through the tanks with a view to the removal of superficial or absorbed moisture from the grain. Means are also provided for the introduction of carbonic-acid gas into the tanks after the air has been exhausted or while such air is being exhausted. These means are shown in Fig. 7, in which the carbonic-acid-gas pipe $f$, for a set of seven tanks T, has seven branches $h$, provided with stop-cocks or valves $i$, connecting said pipe $f$ with the tanks, which in said Fig. 7 I have shown as an isolated group. These pipes are preferably embedded in the concrete floor and open into the tanks above said floor, their ends being bent downward to prevent the grain from passing thereinto; or the mouth of the pipes may be covered with wire-gauze, suitable hand-holes being provided in the concrete for gaining access to the valves or stop-cocks, though these pipes may also be located above the concrete floor. Of course where a greater number of tanks are employed, as shown in Figs. 1 and 2, the pipe $f$ is arranged accordingly.

It frequently happens that grain is brought for storage that is not perfectly dry, or, as heretofore stated, has become more or less damp during transportation. Such grain is preferably dried after introduction into the tank by drawing air therethrough by means of the exhaust-blower and the air-pipes above referred to. This accomplished, the air can be exhausted from the tanks and carbonic-acid gas substituted therefor.

The operation of my improved storage system may be briefly described as follows: The conveyance that brings the grain for storage or that is intended to take it from the storage-tanks to market, whether boat, car, or other conveyance, is moved alongside of the set of tanks one of which is to receive the grain, or from one of which the grain is to be taken. It being assumed that the necessary steam has been raised in the generator or generators to supply the engines that drive the exhaust-blowers F, the movable or swinging supply-pipe P³ is swung into the conveyance and its nozzle N placed in the grain. The proper valve in the steam-connection is now opened to set the engine E' into operation to drive the exhaust-blower F in the direction that will exhaust the air from the receiver. Owing to the peculiar construction of the nozzle, as described in my Letters Patent for this, above referred to, there is not merely a suction that tends to draw the grain through the pipe P³, which, if grain alone were to pass through said pipe, would result in great friction and loss of power, as well as wear of the pipe, but a column of air is drawn through said pipe with the grain, every particle of which is practically surrounded by air. This column of air does not move in a straight line through the pipes, but assumes a more or less spiral or cyclonic form, carrying the grain along with it, so that there is little or no friction between the grain and pipe, each particle of which still remains enveloped by air, the grain-laden air-current flowing with great velocity to the receiver, the effect being, in fact, a column of an elastic fluid enveloping particles of solid matter moving spirally into vacuo, so that with a comparatively low prime motive power large masses can be moved at great velocities, thereby effecting not only a great saving in wear, but also in power and time. As the grain is removed the induction-nozzle N, which is mounted on casters, is moved from one point of the conveyance to another, and, owing to the form of the nozzle, the grain, even in the corners of the conveyance, can be taken up. The adjustable nature of the pipe P³ and the facility with which its nozzle N can be moved from one point to another and the rapidity with which the grain is taken up enable a single man to operate the transfer-pipe with the greatest ease and rapidity, the telescopic portion of the pipe being counterbalanced by a weight W, suspended from a rope or chain $w$, whose other end is connected with the pipe P³, said rope traveling over guide-pulleys $p^{23}$ on the swinging boom S B. (See Fig. 17.) When, however, the transfer-pipes P³ are of large dimensions, they may be or preferably are handled by steam-power through proper shafting or by a hoisting-engine. When the receiver is filled, the contents are weighed. The engine and blower are then reversed to force air into the receiver and through any one of the transfer-pipes P to transfer the grain to the tank intended for its reception. When the auxiliary weighing-receivers E² are used, the discharge and trimming can be facilitated by an air-current.

From the above description of the construction of storage-tanks it will readily be seen that the storage capacity can be varied from a forty-bushel to a one-hundred-thousand-bushel tank, the capacity of the transfer mechanism being varied accordingly. Thus, for instance, the supply-pipe P³ for a twenty-bushel receiver E will be a three-inch pipe, with a capacity of transferring twenty bushels a minute, while for a receiver having a capacity of three thousand bushels a twenty-inch pipe, having a transfer capacity of one thousand bushels a minute, will be employed, and these examples would probably be extreme capacities.

There is to my knowledge no system for displacement or conveyance of solids that requires so little power relatively to the masses displaced as this pneumatic system. On the other hand, in the displacement of grain by this system the contact of the grain with the cool air during the displacement is of such benefit that the value thereof is greater than the cost of handling the grain.

Although I have described the transfer and weighing appliances as applied to steel storage-tanks, such appliances may be equally well applied to warehouses or granaries.

There being no doubt as to the possibility of keeping grain in a sound condition for any length of time in an air-tight storage-chamber, and, as the pneumatic-transfer appliances solve the problem of utilizing air-tight storage-chambers, there is no reason why the entire grain crop of the country may not be stored and kept in good condition.

Grain, if stored in good condition in an air-tight reservoir, embodies within itself the necessary elements of preservation, inasmuch as carbonic acid is evolved, and whenever three-tenths of the oxygen present is replaced by carbonic acid decomposition cannot result. Hence there are no losses in this system of storage so long as these conditions exist.

Having described my invention, what I claim, and desire to secure by Letters Patent, is—

1. A landing storage and transfer station for food products, consisting of piers separated by intervening slips, said piers being located at an acute angle to the water-front, railway-tracks upon the piers and parallel to the slips, a railway-track parallel to the water-front and connected with the railway-tracks on the piers, and storage-cells upon the piers, said cells being parallel to the slips and to the water-front, substantially as and for the purposes specified.

2. A storage-station for food products, comprising a plurality of contiguous cells having their interiors separated from each other by intersecting cylindriform partitions, substantially as and for the purposes specified.

3. A storage-station for food products, comprising a plurality of contiguous cells having their interiors separated from each other by intersecting cylindriform partitions, the axial centers of adjacent partitions being equal distances from each other throughout the system, substantially as and for the purposes specified.

4. The combination, with a plate-metal storage tank or tanks having concrete bottoms for such, of a supporting-anchor Z-shaped in cross-section, to one flange of which the tank is riveted, said anchor being in part embedded in the concrete bottom, substantially as and for the purposes specified.

5. A plate-steel storage-tank comprising a cylindrical or substantially cylindrical body, an encompassing topping-angle at the upper end, and an encompassing anchor-plate Z-shaped in cross-section at the lower end, in combination with a dome secured to the topping-angle, arch-girders of angular section for supporting the dome, and an angular crown-plate secured to the arch-girders or rafters and to the dome, substantially as and for the purposes specified.

6. A plate-metal storage-tank comprising a cylindrical or substantially cylindrical body, an encompassing topping-angle at the upper end, and an encompassing anchor-plate Z-shaped in cross-section at the lower end, in combination with a dome secured to the topping-angle, arch-girders or rafters of angular section for supporting the dome, an annular crown-plate secured to the arch-girders or rafters and to the dome, and a vertical stay for supporting the crown-plate, substantially as and for the purposes specified.

7. A storage-station for food products, comprising a plurality of storage-cells composed of mutilated cylinders grouped together and interconnected, so that a portion of one cell will form a corresponding portion of one or more contiguous cells, a valved air-conduit, and a carbonic-acid-gas conduit connected with the tanks at bottom, said carbonic-acid-gas conduit having a valved branch for each of said cells, substantially as and for the purposes specified.

8. A storage-station for food products, comprising a plurality of storage-cells composed of mutilated cylinders grouped together and interconnected so that a portion of one cell will form a corresponding portion of one or more contiguous cells, valved air-conduits connected with the cells at bottom, valved carbonic-acid-gas conduits also connected with the cells at bottom and an exhaust-blower connected with the cells at top, a receiver interposed in the connection between the cells and exhaust-blower, and a transfer-pipe P³, connected with the receiver, substantially as and for the purposes specified.

9. A storage-station for food products, comprising a group of air-tight storage-cells composed of mutilated cylinders grouped together and interconnected so that a portion of one cell will form a corresponding portion of a plurality of contiguous cells, an exhaust-blower for each set of cells, said sets being composed of a given number of cells, valved conduits connecting the exhaust-blower with each cell at top and air-conduits connected with the cells at bottom, whereby a partial vacuum may be formed in said cells or air drawn therethrough, and a conduit for admitting carbonic-acid gas at the bottom of the cells, substantially as and for the purposes specified.

10. A storage-station for food products, comprising a group of air-tight storage-cells composed of mutilated cylinders grouped together and interconnected so that a portion of one cell will form a corresponding portion of a plurality of contiguous cells, pneumatic transferring appliances for each set of cells, said sets being composed of a given number of cells for transferring the products to or from the same, comprising a receiver, valved conduits connecting the receiver with the cells, a suction and exhaust-blower connected with the receiver, and a conduit for conducting carbonic-acid gas to said cells, substantially as and for the purposes specified.

11. A storage-station for food products, comprising a group of air-tight storage-cells composed of mutilated cylinders grouped together and interconnected so that a portion of one cell will form a corresponding portion of a plurality of contiguous cells, pneumatic transferring and automatic weighing appliances for each set of cells (said sets being composed of a given number of cells) for weighing and transferring the products to or from the same, valved conduits connecting the transferring device therewith, an exhaust-blower for operating the pneumatic transfer device, a valved connection between said exhaust-blower and each of the cells, and a conduit for conducting carbonic-acid gas thereto, substantially as and for the purposes specified.

12. A storage-station comprising a group of storage-tanks adapted to be hermetically closed, in combination with a pneumatic transfer mechanism and a motor therefor located above the tanks, and ducts for admitting air and carbonic-acid gas to said tanks at the bottom thereof, substantially as and for the purposes specified.

13. A storage-station comprising a group of steel-plate storage-tanks adapted to be hermetically closed, in combination with a pneumatic transfer mechanism such as herein referred to, connected with a plurality of tanks, and a motor for operating the same, said transfer mechanism and motor being located above the tanks and principally supported thereby, substantially as and for the purposes specified.

In testimony whereof I affix my signature in presence of two witnesses.

LYMAN SMITH.

Witnesses:
L. La Rue Smith,
U. G. M. Perrin.